(12) United States Patent
Yano

(10) Patent No.: US 9,733,449 B2
(45) Date of Patent: Aug. 15, 2017

(54) LENS BARREL

(71) Applicant: OLYMPUS CORPORATION, Shibuya-ku, Tokyo (JP)

(72) Inventor: Tomohide Yano, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/752,305

(22) Filed: Jun. 26, 2015

(65) Prior Publication Data

US 2016/0147038 A1  May 26, 2016

(30) Foreign Application Priority Data

Nov. 21, 2014  (JP) ................................. 2014-237007

(51) Int. Cl.
| | |
|---|---|
| G02B 7/02 | (2006.01) |
| G02B 7/00 | (2006.01) |
| G02B 7/14 | (2006.01) |
| G02B 7/08 | (2006.01) |
| G02B 7/10 | (2006.01) |

(52) U.S. Cl.
CPC ............... *G02B 7/14* (2013.01); *G02B 7/021* (2013.01); *G02B 7/08* (2013.01); *G02B 7/10* (2013.01)

(58) Field of Classification Search
CPC . G02B 7/14; G02B 7/023; G02B 7/02; G02B 1/041; G02B 7/08; G02B 7/102; G02B 7/00; G02B 7/021; G02B 7/003; G03B 17/14; G03B 13/34; G03B 17/00; G03B 2205/0046; G03B 13/36; G03B 21/145; G03B 5/00

USPC ....... 359/811, 813, 814, 819, 822, 823, 824, 359/826
See application file for complete search history.

(56) References Cited

U.S. PATENT DOCUMENTS 8,320,064 B2    11/2012  Musha et al.
2009/0067069 A1 *  3/2009  Matsumoto ............ G02B 7/102
                                        359/824
(Continued)

FOREIGN PATENT DOCUMENTS

| JP | 04233506 A | 8/1992 |
| JP | 2000147350 A | 5/2000 |
| JP | 2010085897 A | 4/2010 |

(Continued)

OTHER PUBLICATIONS

Japanese Office Action (and English translation thereof) dated Oct. 20, 2015, issued in counterpart Japanese Application No. 2014-237007.

*Primary Examiner* — Jade R Chwasz
(74) *Attorney, Agent, or Firm* — Holtz, Holtz & Volek PC

(57) ABSTRACT

An interchangeable lens includes a fixing frame in which a front movable lens group and a rear movable lens group are coaxially arranged and movable in the direction of an optical axis. An intermediate member is arranged between a movable range of a lens frame holding the front movable lens group and a movable range of a lens frame 12 holding the rear movable lens group. The intermediate member is a partition between the movable lens groups and prevents interference between them. In addition, the intermediate member blocks undesired light components which are part of the light incident on the fixing frame and traveling from the front movable range to the rear movable range.

8 Claims, 20 Drawing Sheets

(56) References Cited

U.S. PATENT DOCUMENTS

2011/0122518 A1 5/2011 Musha et al.
2012/0294602 A1* 11/2012 Sekine .............. H01L 27/14618
　　　　　　　　　　　　　　　　　　　　　　　　396/502

FOREIGN PATENT DOCUMENTS

| JP | 2010169844 A | 8/2010 |
| JP | 2011128594 A | 6/2011 |
| JP | 2014052429 A | 3/2014 |

* cited by examiner

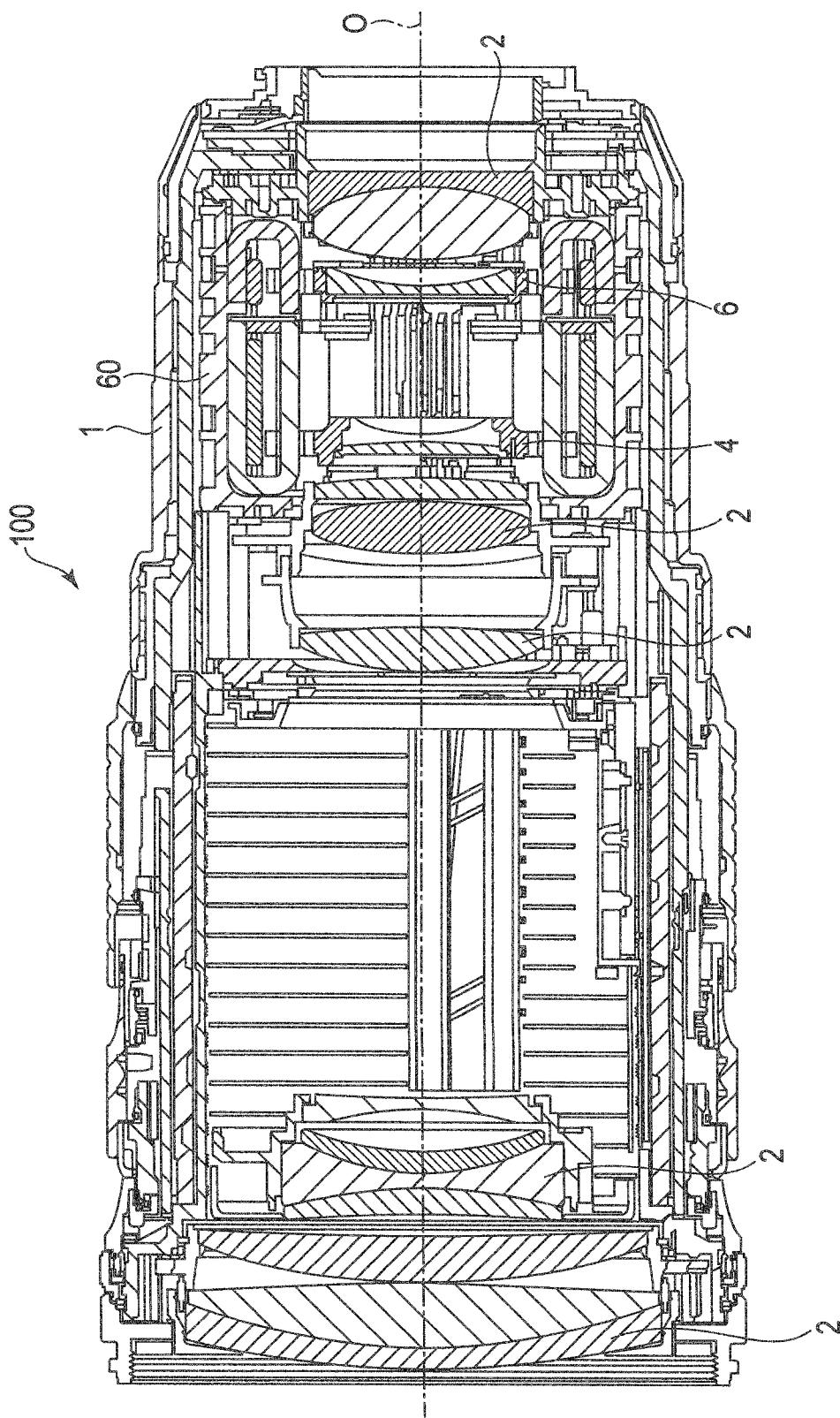
F I G. 2

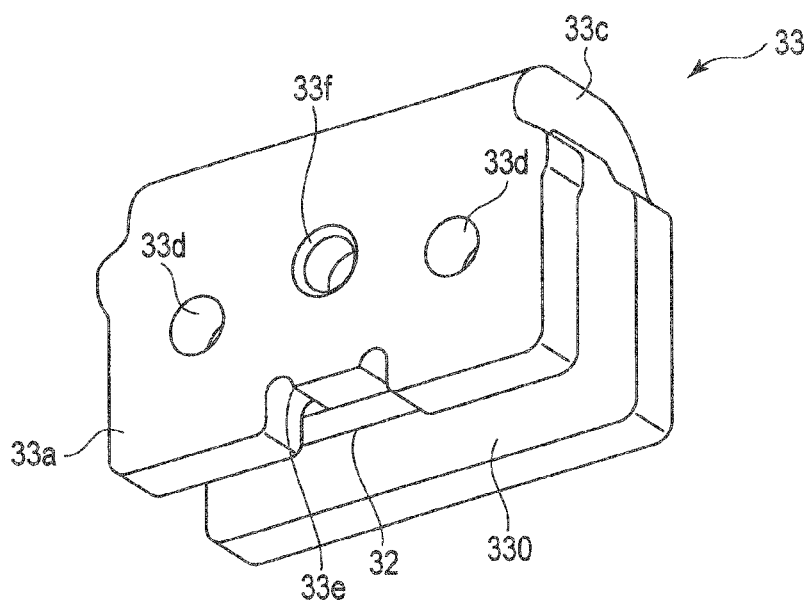
F I G. 15
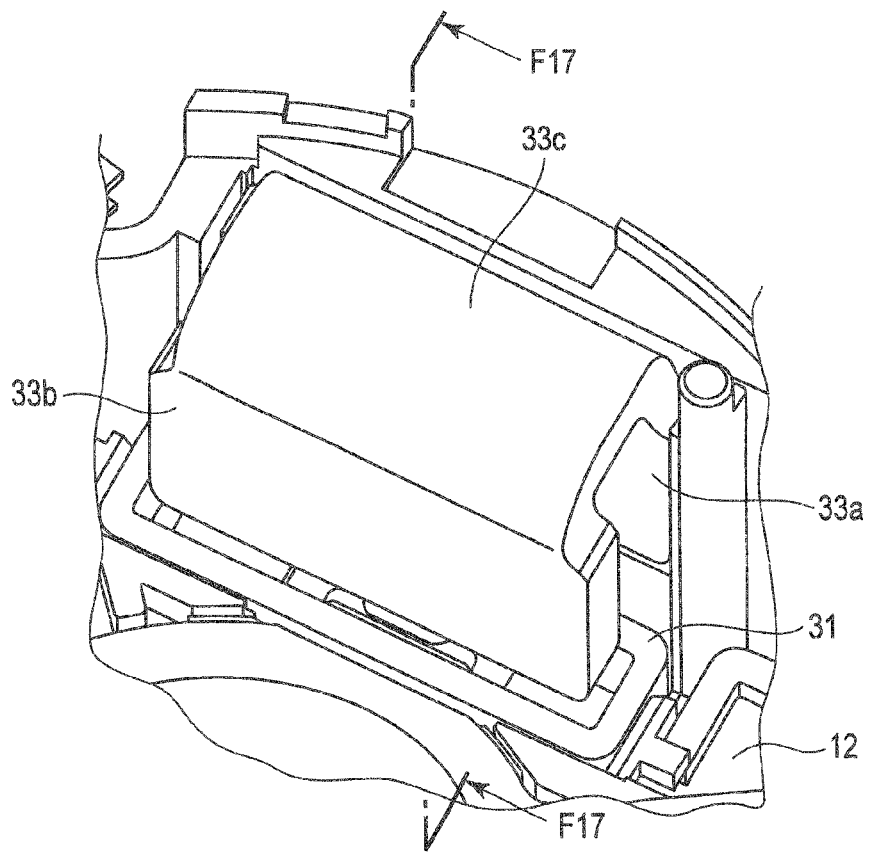
F I G. 16

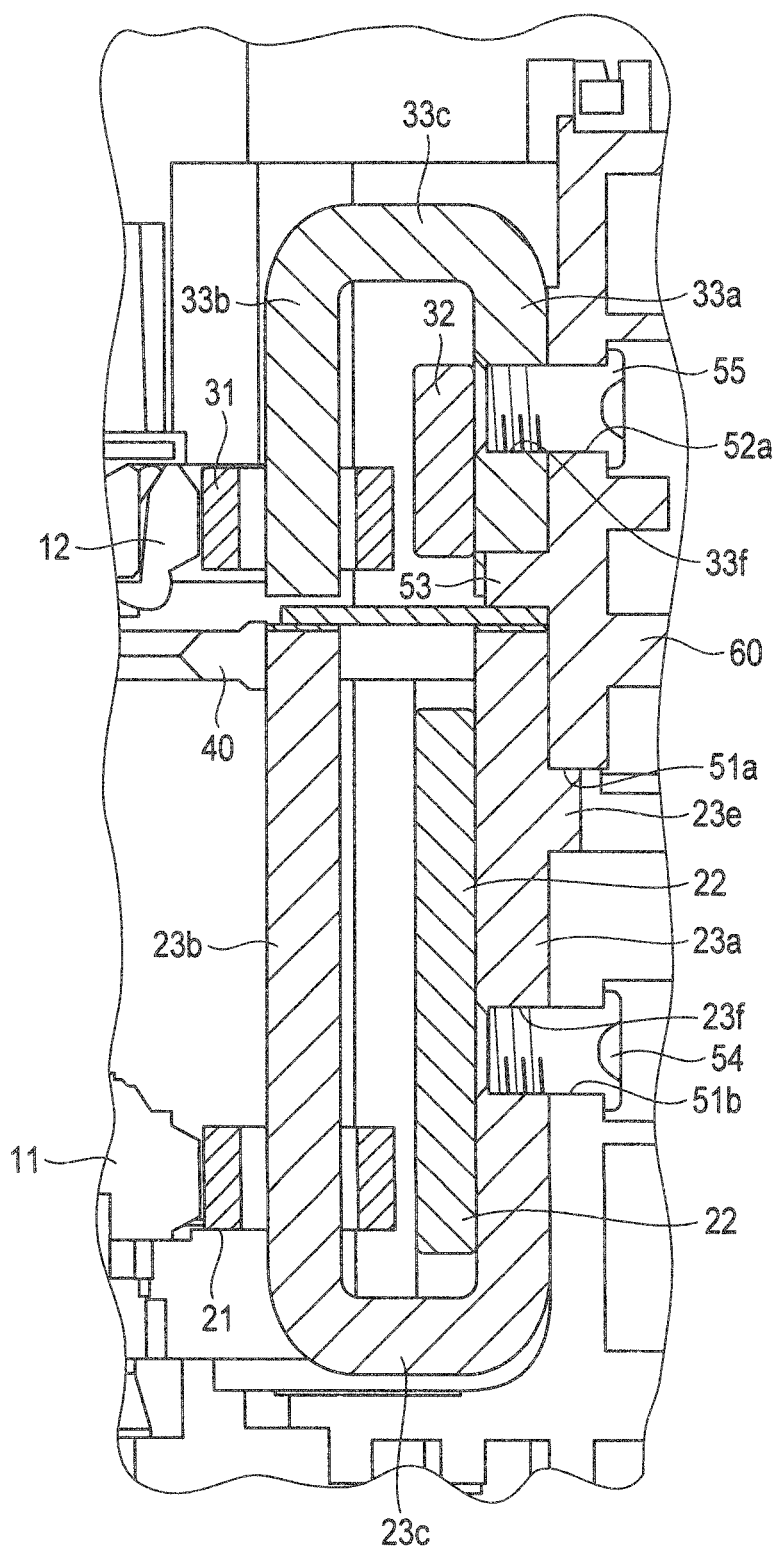
F I G. 17

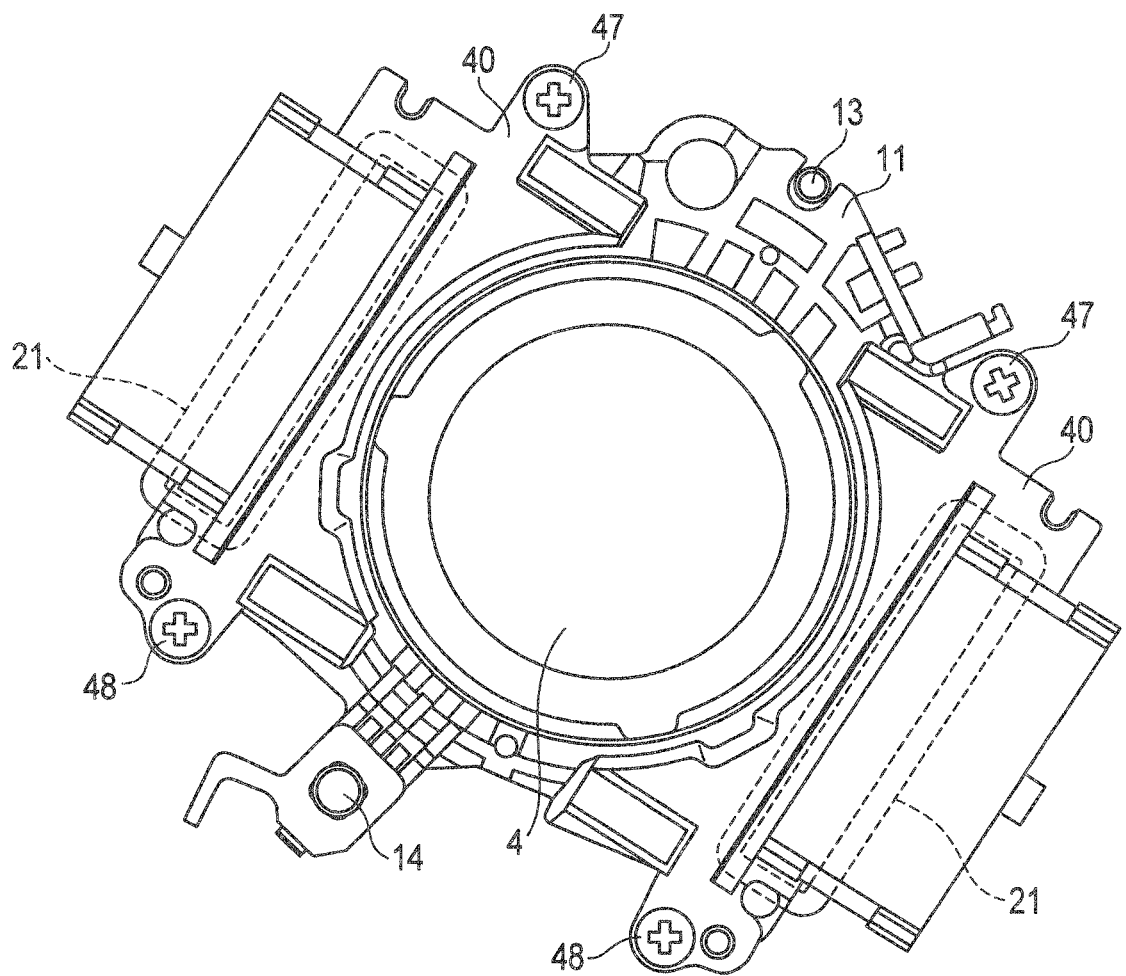
F I G. 21

LENS BARREL

CROSS-REFERENCE TO RELATED APPLICATION

This application is based upon and claims the benefit of priority from Japanese Patent Application No. 2014-237007, filed Nov. 21, 2014, the entire contents of which are incorporated herein by reference.

FIELD

The present invention relates to a lens barrel that enables two sets of lens groups to be moved in the direction of the optical axis.

BACKGROUND

As an example of a lens barrel, an interchangeable camera lens is well known in the art, which is provided with two actuators for moving two sets of lens groups in the direction of the optical axis (see for example Jpn. Pat. Appln. KOKAI Publication No. 2000-14750). Each of the two actuators is a voice coil motor (VCM) including: a coil that is fixed to a movable member that holds a lens group; a magnet fixed to an outer frame and opposed to the coil; and a yoke for forming a magnetic circuit.

When a current flows to the coil of the VCM, the movable member moves along the yoke in the direction of the optical axis by electromagnetic induction.

In the state where no current is supplied to the coil, however, the movable member can freely move along the yoke. For this reason, a partitioning plate has to be provided between two movable members.

If the coil is movable with respect to the yoke, light may undesirably travel through a gap between the coil and the yoke. Such light does not sequentially travel through the two lens groups and has adverse effects on the images photographed by the camera.

The present invention has been made in consideration of the above, and is intended to provide a lens barrel which prevents lenses from colliding with each other in the non-current supply mode, and which provides reliable optical characteristics in the current supply mode.

SUMMARY

A lens barrel according to one aspect of the present invention relates to a lens barrel in which a first movable member holding a first lens group and a second movable member holding a second lens group are arranged in the direction of the optical axis and made movable with respect to a fixing frame. The lens barrel comprises: a first actuator including a first coil a first magnet opposed to the first coil, and a first yoke and configured to move the first movable member in the direction of the optical axis by a first magnetic circuit formed by the first coil, the first magnet and the first yoke; a second actuator including a second coil, a second magnet opposed to the second coil, and a second yoke and configured to move the second movable member in the direction of the optical axis by a second magnetic circuit formed by the second coil, the second magnet and the second yoke and being magnetically independent of the first magnetic circuit; and an intermediate member located between the first movable member and the second movable member and including a collision preventing member that prevents a diaphragm of an optical system, including the first lens group and the second lens group, from colliding with the first movable member and the second movable member.

A lens barrel of the present invention prevents lenses from colliding with each other in the non-current supply mode, and provides reliable optical characteristics in the current supply mode.

BRIEF DESCRIPTION OF THE DRAWINGS

FIG. 1 shows how an interchangeable lens of an embodiment looks like.

FIG. 2 shows a longitudinal section of the interchangeable lens depicted in FIG. 1.

FIG. 4 is a perspective view showing how the assembly depicted in FIG. 3 looks like.

FIG. 7 is a perspective view showing how a first yoke attached to the fixing frame depicted in FIG. 6 looks like.

FIG. 11 is a perspective view showing how a third yoke looks like.

FIG. 15 is a perspective view showing how a second yoke looks like.

FIG. 16 is a perspective view illustrating a state in which the second yoke depicted in FIG. 15 is assembled in the fixing frame.

FIG. 17 is a partially-sectional view taken along line F17-F17 in FIG. 16.

FIG. 21 is a schematic diagram illustrating how the rear portion of the assembly looks like in the state in which the rear lens frame is removed.

DETAILED DESCRIPTION

Hereinafter, an embodiment of the present invention will be described with reference to the drawings.

Figure 1:
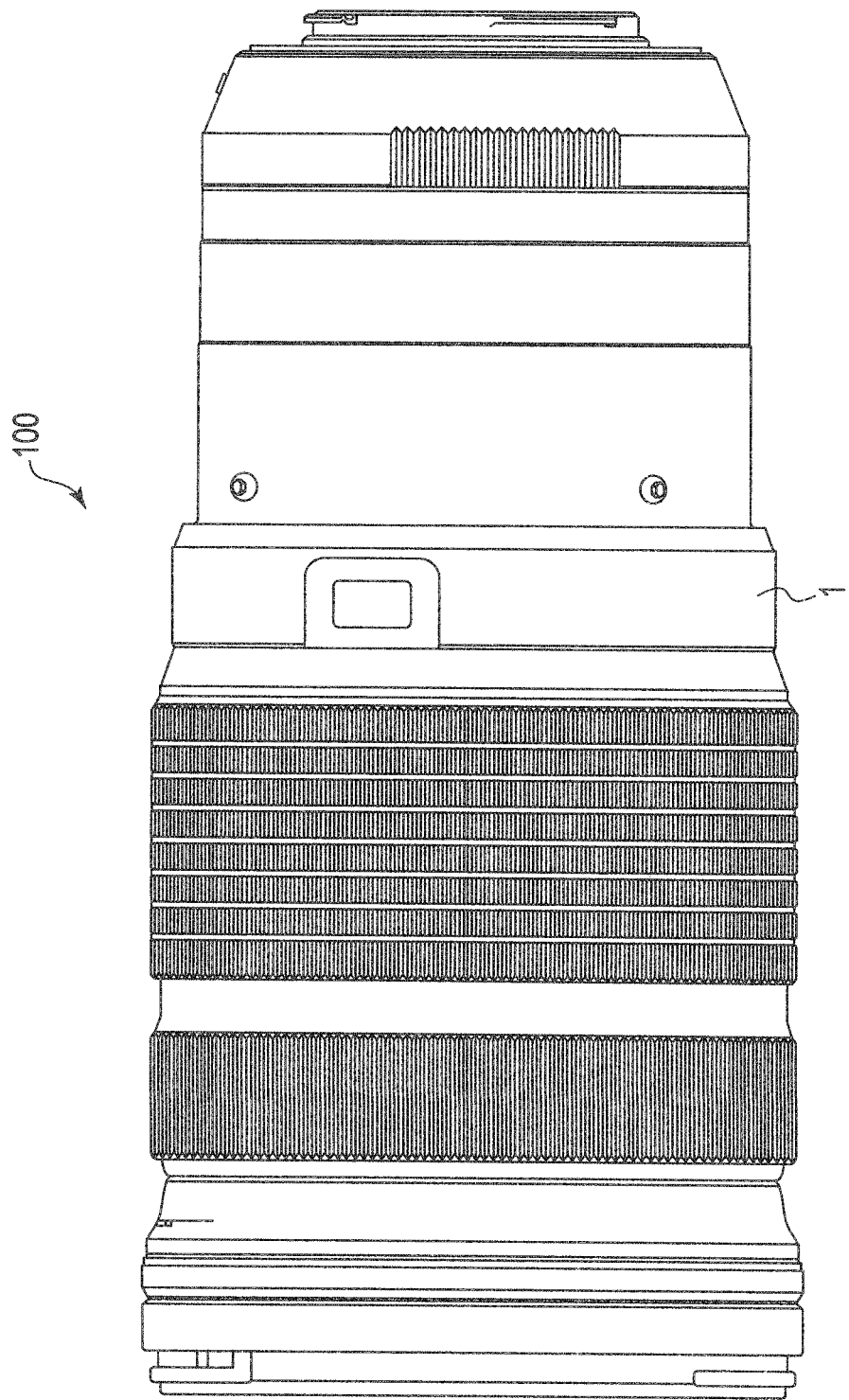

FIG. 1 shows how an interchangeable lens 100 according to the embodiment of the present invention looks like. FIG. 2 shows a longitudinal section of the interchangeable lens 100 depicted in FIG. 1, the longitudinal section containing the optical axis O. The interchangeable lens 100 is an interchangeable lens that is removably attached to a digital camera (not shown). The interchangeable lens 100 includes two movable lens groups 4 and 6 mentioned later. In the descriptions given below, an object (not shown) on the optical axis O, which is to be photographed, will be mentioned as being located frontward (the left side of the drawing sheets), and a camera body (not shown) will be mentioned as being located rearward (the right side of the drawing sheets).

The interchangeable lens 100 has a substantially cylindrical outer frame 1, the outer diameter of which increases slightly along the optical axis in the forward direction, A plurality of fixed lens groups 2 are arranged inside the outer frame 1 and are spaced from each other along the optical axis O. Two movable lens groups 4 and 6 are arranged inside the outer frame 1 and are movable back and forth along the optical axis O. The movable lens groups 4 and 6 are assembled in a fixing frame 6 (FIG. 6), mentioned later, and attached inside the outer frame 1. Lens groups 2, 4 and 6 are arranged coaxial, with the optical axis O passing through the centers of them.

Figure 3:
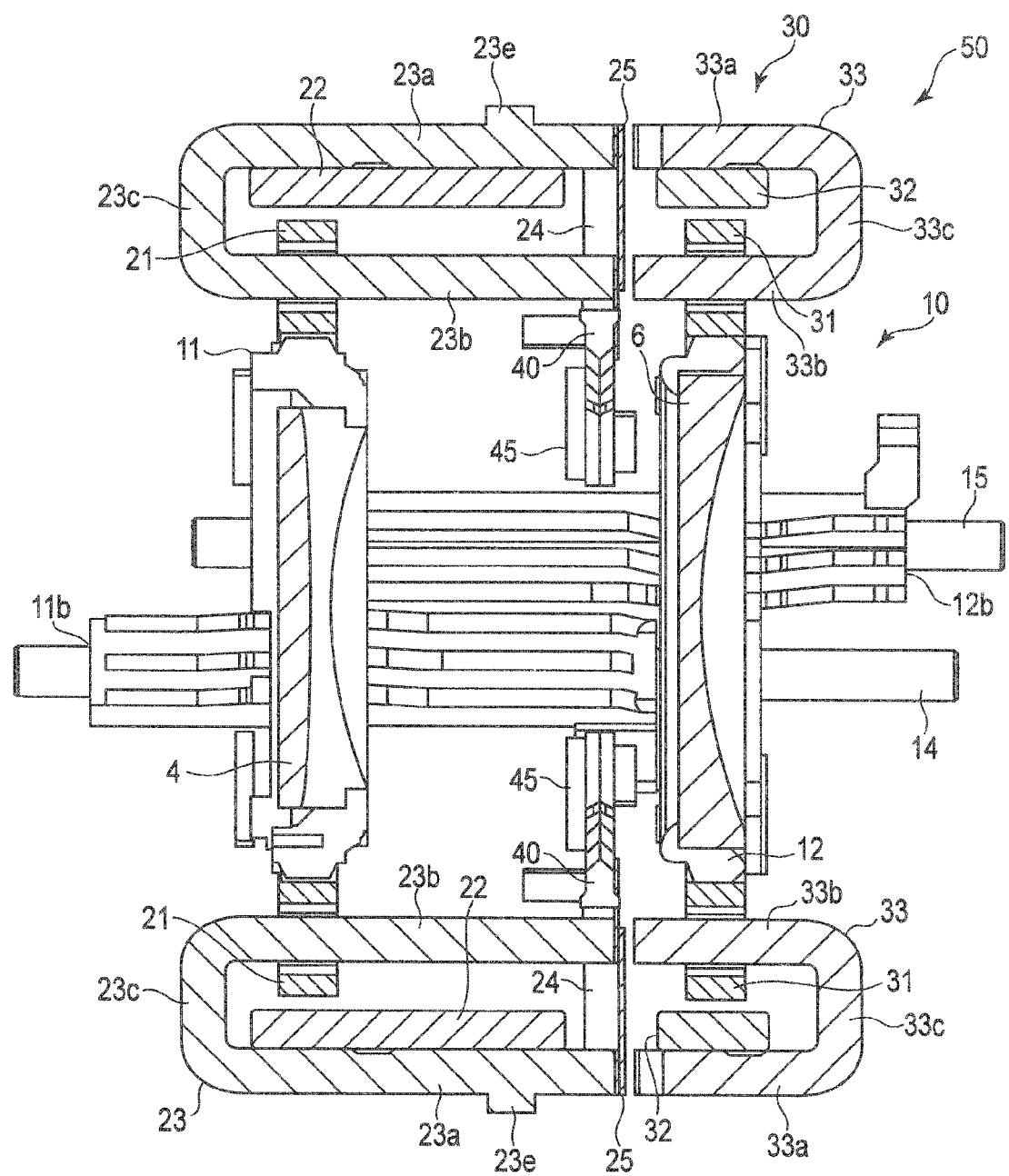
FIG. 3 is a sectional view of an assembly, the assembly including two movable lens groups incorporated in the interchangeable lens of FIG. 2, a support mechanism, two actuators and an intermediate member.
Figure 4:
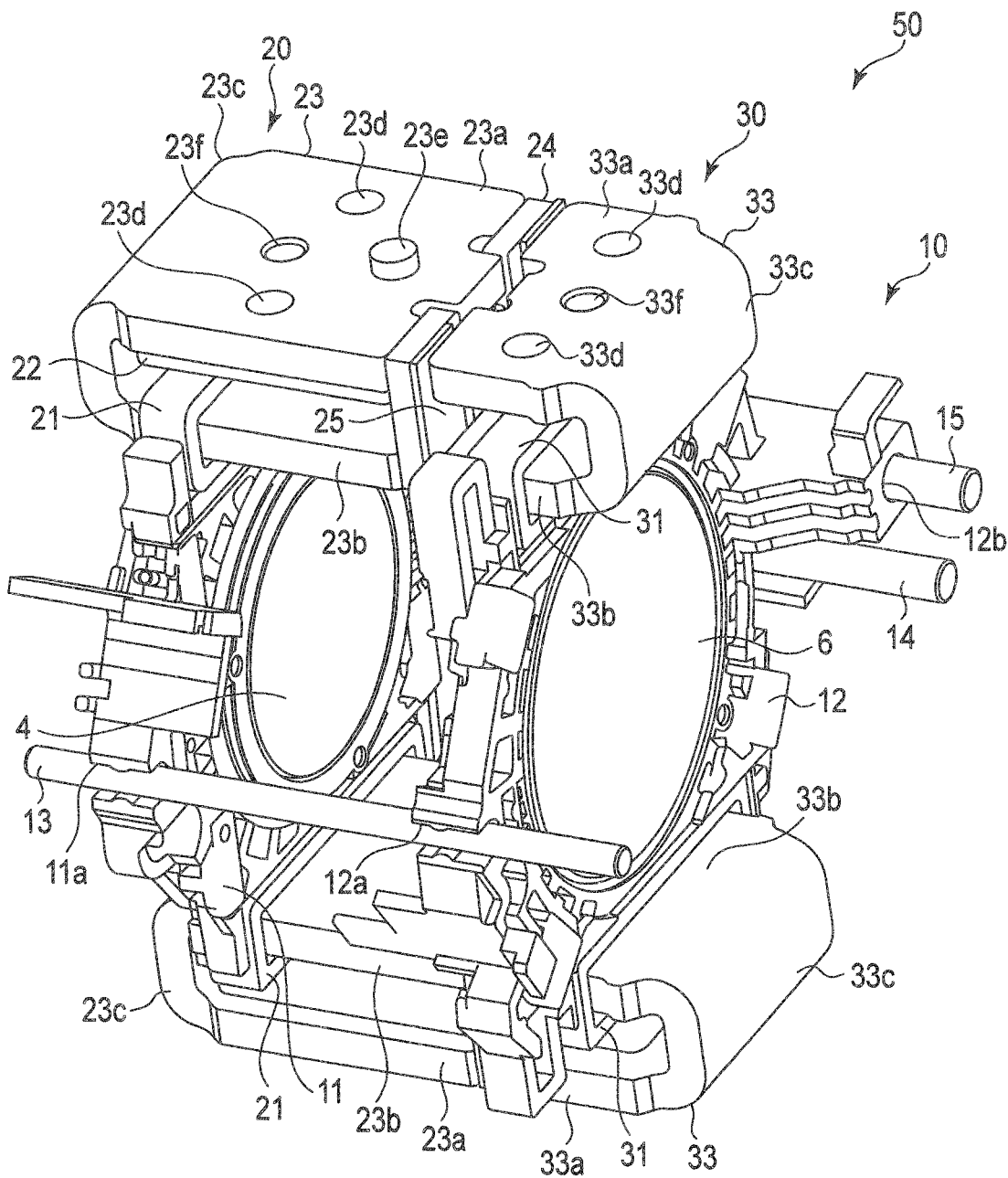
Figure 5:
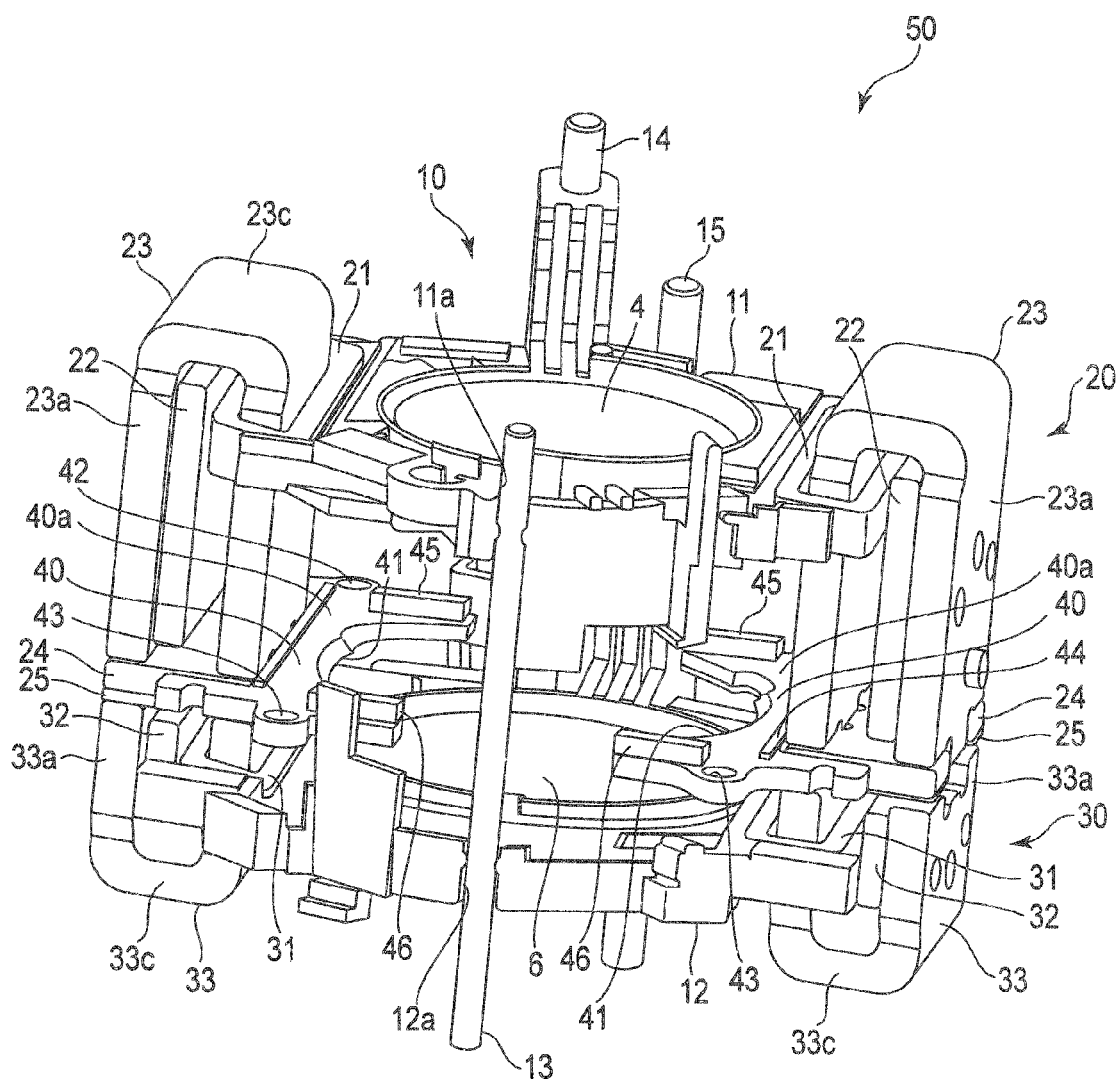
FIG. 5 is a perspective view showing how the assembly depicted in FIG. 4 looks like when viewed in a different direction.

FIG. 3 is an enlarged sectional view showing an assembly 50. The assembly 50 includes: a support mechanism 10 for supporting the two movable lens groups 4 and 6 so that the movable lens groups 4 and 6 are movable in the direction of the optical axis O; actuator 20 (first actuator) for driving front movable lens group 4; actuator 30 (second actuator) for driving rear movable lens group 6; and an intermediate member 40 (a diaphragm, a collision preventing member). FIG. 4 is a perspective view showing how the assembly depicted in FIG. 3 looks like, and FIG. 5 is a perspective view showing how the assembly of FIG. 4 looks like when viewed in a different direction from that of FIG. 4. In FIG. 4, the intermediate member 40 is not shown for easy understanding of the structure. The assembly 50 is assembled in a fixing frame 60, mentioned later, and attached inside the outer frame 1.

The support mechanism 10 supports lens frame 11 (the first movable member) in such a manner that the lens frame 11 is movable in the direction of the optical axis O. The support mechanism also supports lens frame 12 (the second movable member) in such a manner that the lens frame 12 is movable in the direction of the optical axis O. Lens frame 11 holds the front movable lens group 4 (the first lens group). Lens frame 12 holds the rear movable lens group 6 (the second lens group). Actuator 20 drives the front lens frame 11 supported by the support mechanism 10 back and forth along the optical axis O. Actuator 30 drives the rear lens frame 12 supported by the support mechanism 10 back and forth along the optical axis O. The intermediate member 40 is a partition between the range in which lens frame 11 is moved by actuator 20 (the first movable range) and the range in which lens frame 12 is moved by actuator 30 (the second movable range). The intermediate member 40 blocks unnecessary light components which are included in the light passing through the first movable range and entering the second movable range.

More specifically, the support mechanism 10 includes lens frame 11 that holds the front movable lens group 4 and lens frame 12 that holds the rear movable lens frame 6. The two lens frames 11 and 12 are orientated in parallel to planes perpendicular to the optical axis O and are arrayed in the direction of the optical axis O. The intermediate member 40 is located between the movable range of the front lens frame 11 and the movable range of the rear lens frame 12. It prevents the two movable lens groups 4 and 6 from coming into contact with each other. A shock absorbing member (not shown) is provided at the front end of the movable range of the front lens frame 11 and at the rear end of the movable range of the rear lens frame 12, in order to limit the movable ranges of the lens frames 11 and 12.

The support mechanism comprises three guide shafts 13, 14 and 15 each having a circular cross section. The guide shafts 13, 14 and 15 hold the two lens frames 11 and 12 in such a manner that the two lens frames 11 and 12 are movable in the direction of the optical axis O. The three guide shafts 13, 14 and 15 are located close to the inner surface of the fixing frame 60 and extend in parallel to the optical axis O. The guide shafts 13, 14 and 15 are secured to the fixing frame 60. Two guide shafts 14 and 15 are away from guide shaft 13 in the diameter direction of the lenses; they are located radially opposite to guide shaft 13. The diameter of guide shaft 13 is smaller than that of guide shafts 14 and 15.

The smaller-diameter guide shaft 13 movably holds the two lens frames 11 and 12. One (14) of the larger-diameter guide shafts movably holds the front lens frame 11. The other one (15) of the larger-diameter guide shafts movably holds the rear lens frame 12. In other words, the front lens frame 11 is movably held by two guide shafts 13 and 14, while the rear lens frame 12 is movably held by two guide shafts 13 and 15.

The front lens frame 11 has a U-shaped fitting groove 11a into which the guide shaft 13 is fitted, and likewise, the rear lens frame 12 has a U-shaped fitting groove 12a into which the guide shaft 13 is fitted. The front lens frame 11 has a through hole 11b through which guide shaft 14 extends, and likewise, the rear lens frame 12 has a through hole 12b into which guide shaft 15 extends. The through hole 11b of the lens frame 11 is away from the fitting groove 11a in the diameter direction of the lenses, and is located radially opposite to fitting groove 11a. Likewise, the through hole 12b of the lens frame 12 is away from the fitting groove 12a in the diameter direction of the lenses, and is located radially opposite to fitting groove 12a.

The actuator 20 for driving the front movable lens group 4 includes two driving units which are located opposite to each other in the diameter direction of the lenses. The actuator 30 for driving the rear movable lens group 6 includes two driving units which are located opposite to each other in the diameter direction of the lenses. Since the driving units are similar in both structure and function, one of them will be described, and reference to the other will be omitted.

The actuator 20 for driving the front lens frame 11 includes a first coil 21, a first magnet 22 and a first yoke 23. The first coil 21 is fixed to the outer edge of the lens frame 11. The first magnet 22 faces the outer surface of the first coil 21, with a certain distance maintained, and is secured to the fixing frame 60. The first yoke 23 forms a first magnetic circuit in cooperation with the first magnet 22 and the first coil 21. The actuator 20 is provided with a third yoke 24 arranged in such a manner that the third yoke 24 is in contact with the ends of the first yoke 23 opposed to the second yoke 33. The third yoke 24 constitutes part of the first magnetic circuit.

The first yoke 23 has a U-shaped cross section. That is, the portion away from the second yoke 33 (i.e., the front end portion) is bent to form the U shape, and the first yoke 23 can be formed by bending a substantially rectangular magnetic plate at the center. More specifically, the first yoke 23 includes: a first portion 23a secured to the inner surface of the fixing frame 60; a second portion 23b separate from the first portion 23a and located on the inner side of the fixing frame 60 than the first portion 23a; and a connection portion 23c for integrally connecting the first portion 23a and the second portion 23b at their first ends. The first yoke 23 has an opening 230 located at the second ends of the first and second portions 23a and 23b. The third yoke 24 is provided inside the opening 230.

The first magnet 22 is attached to the inner surface of the first portion 23a of the first yoke 23 at a position away from the fixing frame 60. The second portion 23b of the first yoke 23 is inserted in the first coil 21 in a non-contact state. The first coil 21 is not in contact with the first magnet 22, either. With this structure, the first coil 21 is movable along the second portion 23b of the first yoke 23 in the direction of the optical axis O, without coming into contact with the surrounding members.

When a current is supplied to the first coil 21 from a driving circuit (not shown), a magnetic field having a direction determined by the current supply direction is generated around the first coil 21. By electromagnetic induction, a magnetic force is applied to the first coil 21 from the first magnet 22, and the lens frame 11 is moved to one end in the direction of the optical axis. By changing the direction in which the current is supplied to the first coil 21, the lens frame 11 is moved to the opposite end in the direction of the optical axis.

On the other hand, the actuator 30 for driving the rear lens frame 12 includes a second coil 31, a second magnet 32 and a second yoke 33. The second coil 31 is fixed to the outer edge of the lens frame 12. The second magnet 32 faces the outer surface of the second coil 21, with a certain distance maintained, and is secured to the fixing frame 60. The second yoke 33 forms a second magnetic circuit in cooperation with the second magnet 32 and the second coil 31.

The second yoke 33 has a U-shaped cross section. That is, the portion away from the first yoke 23 (i.e., the rear end portion) is bent to form the U shape, and the second yoke 33 can be formed by bending a substantially rectangular magnetic plate at the center. More specifically, the second yoke 33 includes: a first portion 33a secured to the inner surface of the fixing frame 60; a second portion 33b separate from the first portion 33a and located on the inner side of the fixing frame 60 than the first portion 33a; and a connection portion 23c for integrally connecting the first portion 33a and the second portion 33b at their first ends. The second yoke 33 is shorter than the first yoke 23 in the direction of the optical axis O. The second yoke 33 has an opening 330 located at the second ends of the first and second portions 33a and 33b.

The second magnet 32 is attached to the inner surface of the first portion 33a of the second yoke 33 at a position away from the fixing frame 60. The second portion 33b of the second yoke 33 is inserted in the second coil 31 in a non-contact state. The second coil 31 is not in contact with the second magnet 32, either. With this structure, the second coil 31 is movable along the second portion 33b of the second yoke 33 in the direction of the optical axis O, without coming into contact with the surrounding members.

When a current is supplied to the second coil 31 from a driving circuit (not shown), a magnetic field having a direction determined by the current supply direction is generated around the second coil 31. By electromagnetic induction, a magnetic force is applied to the second coil 31 from the second magnet 32, and the lens frame 12 is moved to one end in the direction of the optical axis. By changing the direction in which the current is supplied to the second coil 31, the lens frame 12 is moved to the opposite end in the direction of the optical axis.

The intermediate member 40 includes two portions away from each other in the diameter direction of the lenses. The two portions of the intermediate member 40 are provided in correspondence to the two driving units of each of the actuators 20 and 30. Since the two portions of the intermediate member 40 are similar in structure, only one of them will be mentioned and referred to as the "intermediate member 40" in the descriptions set forth below.

The intermediate member 40 is a plate member having a black surface. The intermediate member 40 is located near the opening 23 of the first yoke 23, that is, at a position facing the inner surface of the third yoke 24. The intermediate member 40 is arranged in parallel to a plane perpendicular to the optical axis O. In order not to block useful light that sequentially passes through the movable lens groups 4 and 6, the intermediate member 40 has an inner edge 41 which is curved outward in accordance with the outer shapes of the movable lens groups 4 and 6. The intermediate member 40 has two screw holes 42 and 43 at positions close to the respective longitudinal ends. The intermediate member 40 is provided with a rigidity-providing rib 44 at least on one of the surfaces thereof.

Two shock absorbing members 45 and 46 (first shock absorbing members) are pasted to the front surface 40a of the intermediate member 40. In the present embodiment, the shock absorbing members 45 and 46 are provided at the positions with which part of the front lens frame 11 movable along the first yoke 23 comes into contact. In other words, in the present embodiment, no shock absorbing member is provided on the rear surface 40b of the intermediate member 40. That is, the shock absorbing members are required only on one (40a or 40b) of the surfaces of the intermediate member 40, and the number of shock absorbing members is not limited to two.

In the present embodiment, the shock absorbing members 45 and 46 are pasted to the intermediate member 40 to provide a shock absorbing function, but this structure in no way limits the present invention. For example, the intermediate member 40 may be formed of a material having a shock absorbing function. In this case, the intermediate member 40 may have proper rigidity by providing it with the rib 44.

A description will be given with reference to FIGS. 6 to 17 of a structure for fabricating the elements 10, 20, 30 and 40 of the assembly 50 into the fixing frame 60 and of the steps performed for fabricating the elements 10, 20, 30 and 40 of the assembly 50 into the fixing frame 60.

Figure 6:
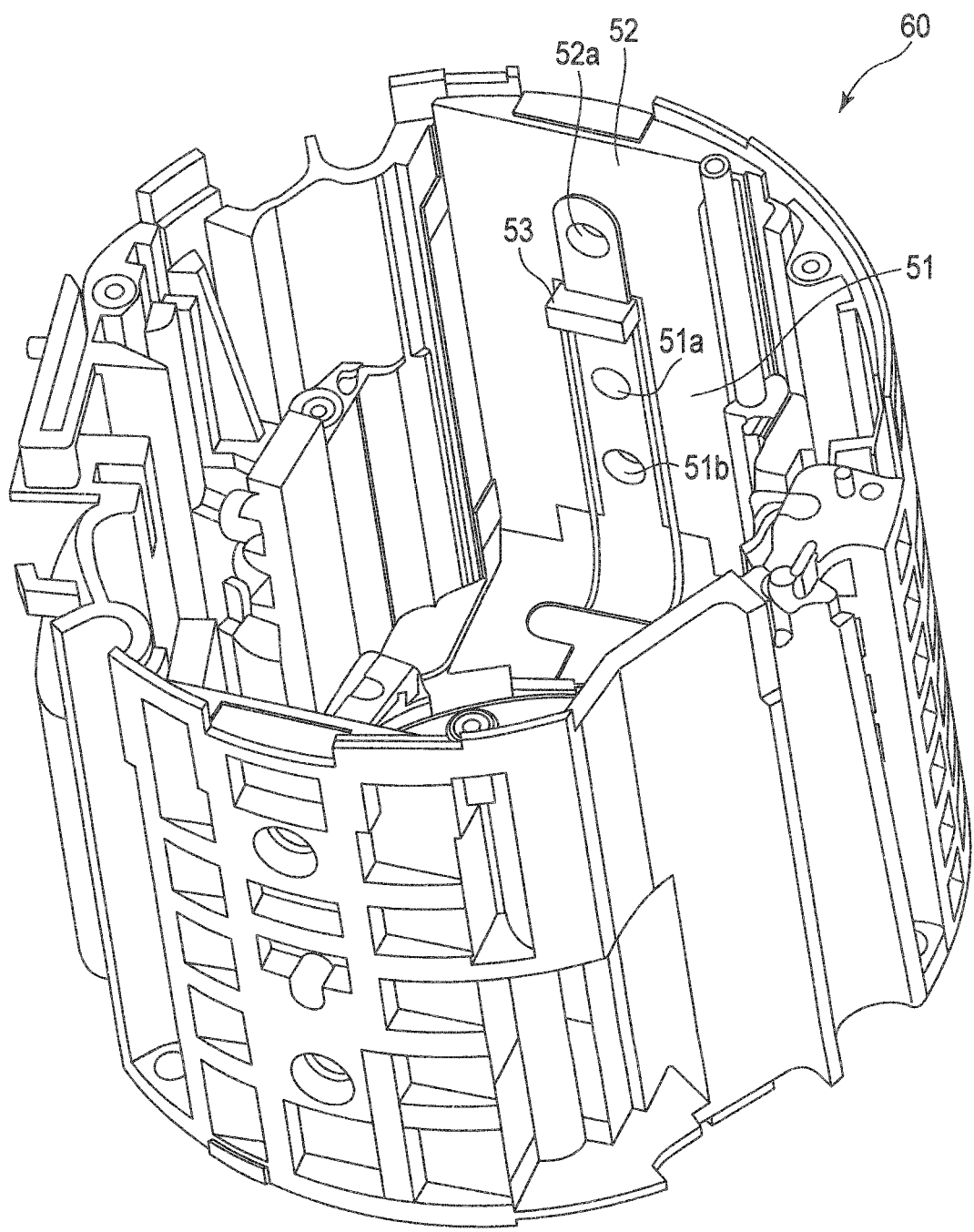
FIG. 6 is a perspective view of a fixing frame, with which the assembly depicted in FIG. 5 is attached to the interchangeable lens depicted in FIG. 1.

FIG. 6 is a perspective view of the fixing frame 60 to be attached to the interior of the outer frame 1 of the interchangeable lens 100. The fixing frame 60 is integral with the outer frame 1 when it is attached to the outer frame in the manner shown in FIG. 2. Therefore, the fixing frame 60 functions as part of the outer frame 1. With the assembly 50 incorporated, the fixing frame 60 is inserted from the rear end of the outer frame 1. A detailed description will not be given of a structure or method for attaching the fixing frame 60 to the outer frame 1.

A first fixing portion 51 for fixing the first yoke 23, a second fixing portion 52 for fixing the second yoke 33, and a rectangular-block projection 53 are provided on the inner wall of the fixing frame 60. The projection 53 is in contact with the second yoke 33, and a gap extending in the direction of the optical axis O is formed between the first yoke 23 and the second yoke 33. The projection 53 defines a gap between the first yoke 23 and the second yoke 33 in the state where the end of the second yoke 33 facing the first yoke 33 is in contact with the projection 53.

As described above, each of the actuators 20 and 30 for driving the movable lens groups 4 and 6 includes two driving units which are away from each other in the diameter direction of the lenses. Therefore, the fixing frame 60 has structures 51, 52 and 53 for attaching the first yoke 23 and the second yoke 33 at the two radially opposite positions on the inner wall of the fixing frame 60. One of the structures will be described, with a description of the other omitted.

Figure 7:
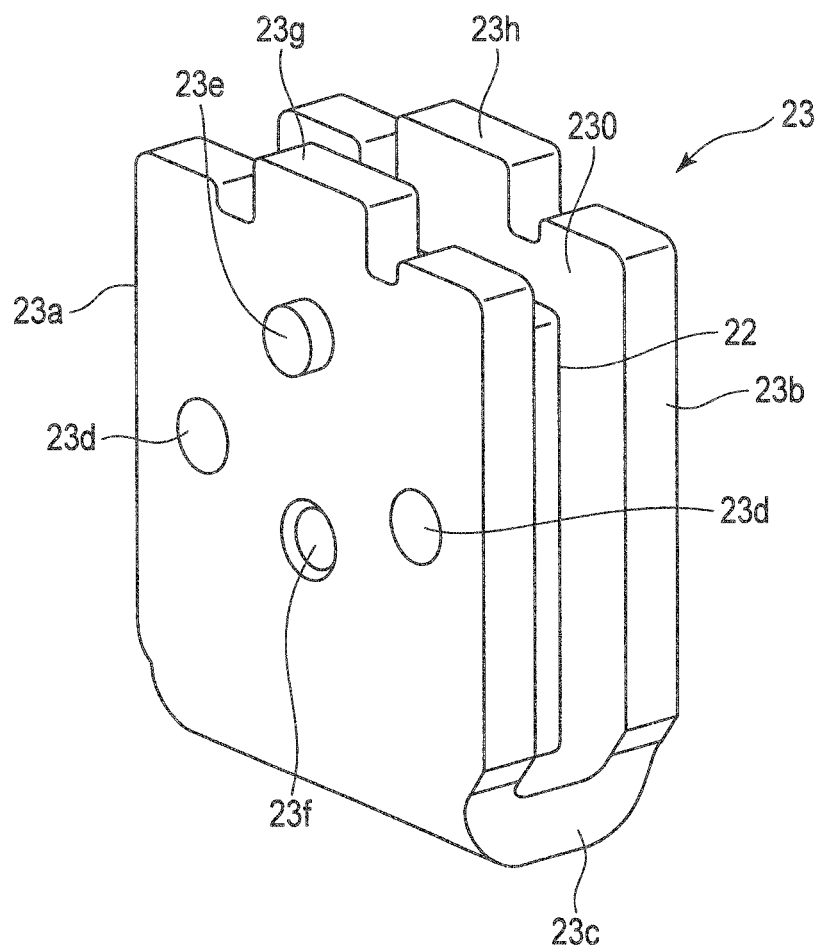
Figure 8:
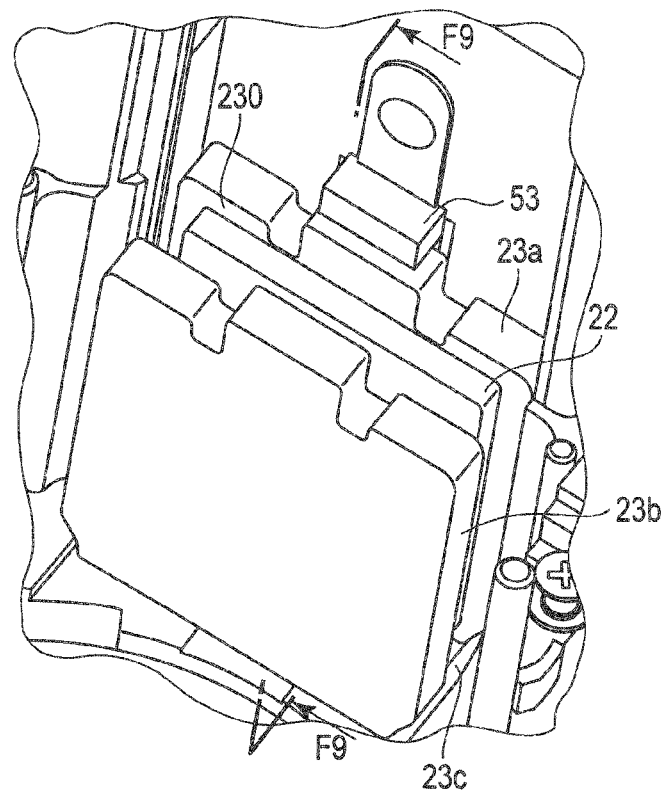
FIG. 8 is a perspective view illustrating a state in which the first yoke depicted in FIG. 7 is attached to the fixing frame depicted in FIG. 6.
Figure 9:
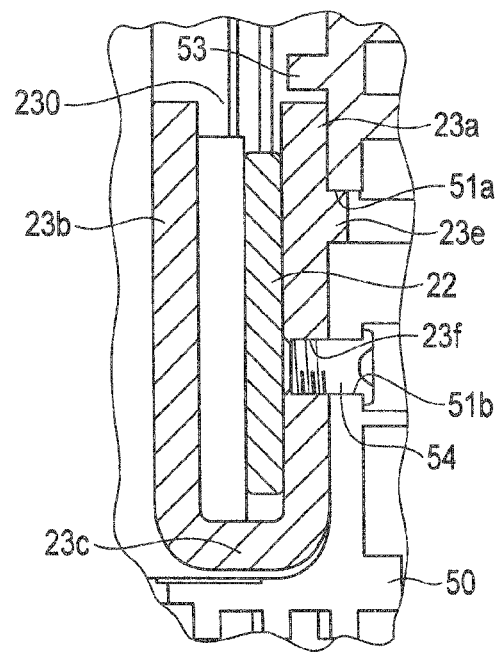
FIG. 9 is a partially-sectional view taken along line F9-F9 in FIG. 8.

FIG. 7 is a perspective view of the first yoke 23 to be attached to the first fixing portion 51 of the fixing frame 60. FIG. 8 is a perspective view illustrating the state where the first yoke 23 is attached to the first fixing portion 51 of the fixing frame 60. FIG. 9 is a partially-sectional view taken along line F9-F9 in FIG. 8. The first yoke 23 has a first magnet 22 on the inner wall of the first portion 23a. The first magnet 22 is adhered to the first portion 23a. The first portion 23a has two through holes 23d for introducing an adhesive.

First of all, the first yoke 23 provided with the first magnet 22 is attached to the first fixing portion 51 of the fixing frame 60. At the time, the first yoke 23 is inserted into the fixing frame 60, with the connecting portion 23c leading forward, and in such a direction that the first portion 23a faces the first fixing portion 51 of the fixing frame 60. The first yoke 23 is positioned with reference to the fixing frame 60 by fitting a boss 23e, projected from the outer surface of the first portion 23a of the first yoke 23, in a positioning hole 31a formed in the first fixing portion 51 of the fixing frame 60. Then, a screw 54 is inserted in a screw insertion hole 51b from the outside of the fixing frame 60 and is threadably engaged with a screw hole 23 formed in the outer wall of the first portion 23a of the first yoke 23. As a result, the first yoke 23 provided with the first magnet 22 is fixed to the first fixing portion 51 of the fixing frame 60.

Figure 10:
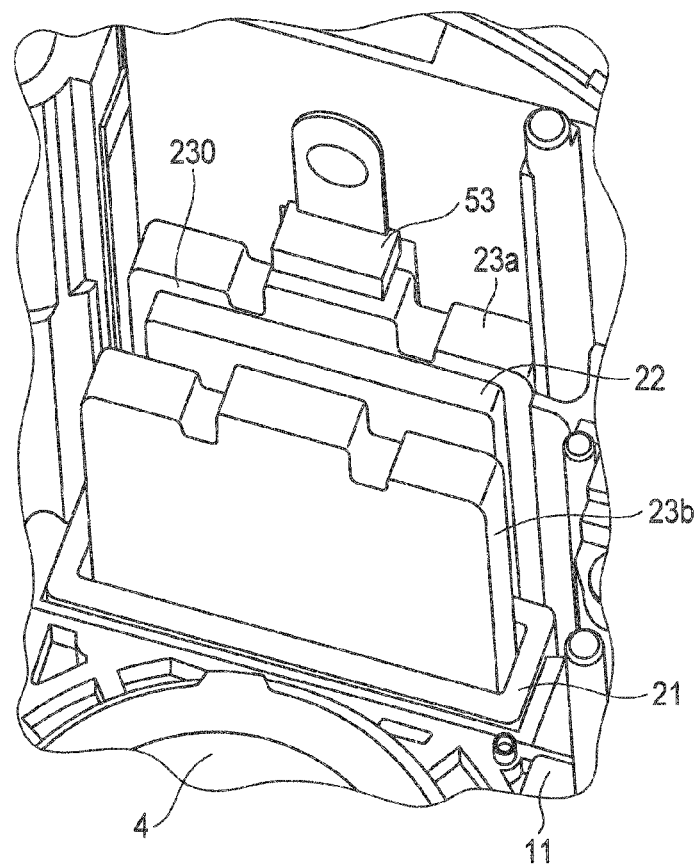
FIG. 10 is a perspective view illustrating a state in which a front lens frame is assembled.

Next, as shown in FIG. 10, the lens frame 11 holding the front movable lens group 4 is attached. At the time, the guide shaft 13 is fitted in the fitting groove 11a of the lens frame 11, the guide shaft 14 is inserted in the through hole 11b of the lens frame 11, and the second portion 23b of the first yoke 23 is inserted in the first coil 21 fixed to the lens frame 11. Since, in this state, the two guide shafts 13 and 14 prevent the lens frame 11 from moving in a direction perpendicular to the optical axis O, the first coil 21 keeps being out of contact with the first yoke 23.

Figure 11:
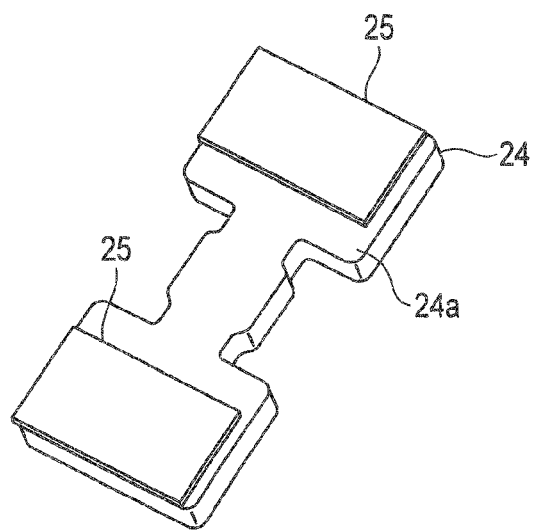

Then, the third yoke 23 is attached in such a manner as to close the rear opening 23o of the first yoke 23. FIG. 11 is a perspective view showing how a third yoke 24 looks like when it is viewed from the second yoke 33. The third yoke 23 is a plate-like magnetic member having a constant thickness. The third yoke 24 is provided with two rectangular sheet-like nonmagnetic members 25. The nonmagnetic members are provided on the surface 24a facing the second yoke 33 and have a uniform thickness. The two nonmagnetic members 25 are pasted on the surface 24a in such a manner that they are away from each other in the longitudinal direction of the third yoke 24.

Figure 12:
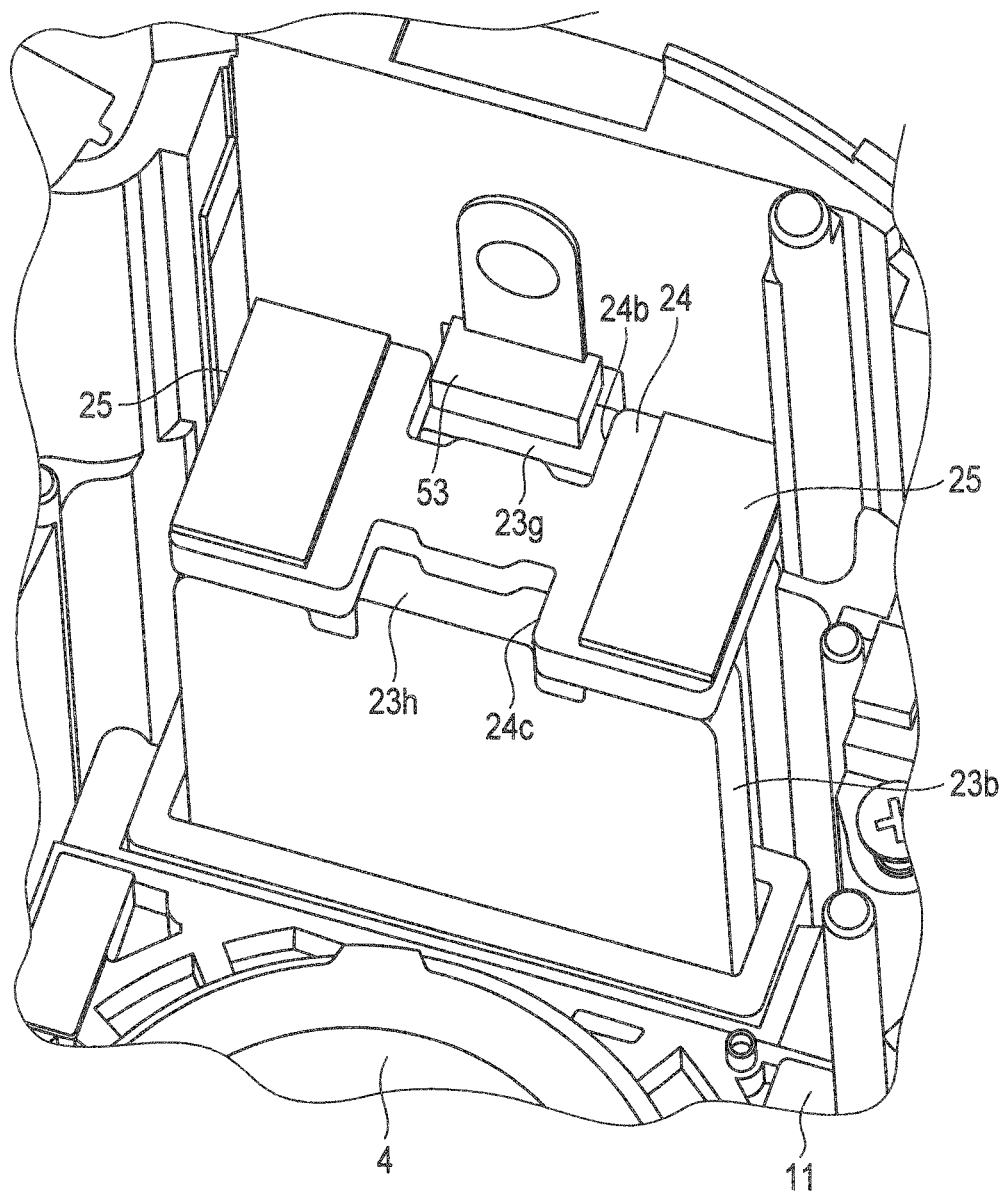
FIG. 12 is a perspective view illustrating a state in which the third yoke depicted in FIG. 11 is attached.

As shown in FIG. 12, the third yoke 24 is attached in contact with the end portion of the first yoke 23 facing the second yoke 33. The third yoke 24 is magnetically attracted toward the first yoke 23 by a magnetic force of the first magnet 22. In other words, the third yoke 24 is not in contact with the first yoke 23.

The third yoke 24 has cutaway sections 24b and 24c. Cutaway section 24b is provided to enable passage of the projection 23g projected from the end of the first portion 23a of the first yoke 23. Cutaway section 24c is provided to enable passage of the projection 23h projected from the end of the second portion 23b of the first yoke 23. The inner surfaces of the cutaway sections 24b and 24c are in contact with the projections 23g and 23h and are magnetically attracted thereby. Incidentally, the third yoke 24 is isolated from the first magnet 22 in the state where it is attached to the first yoke 23, as shown in FIG. 3.

Figure 13:
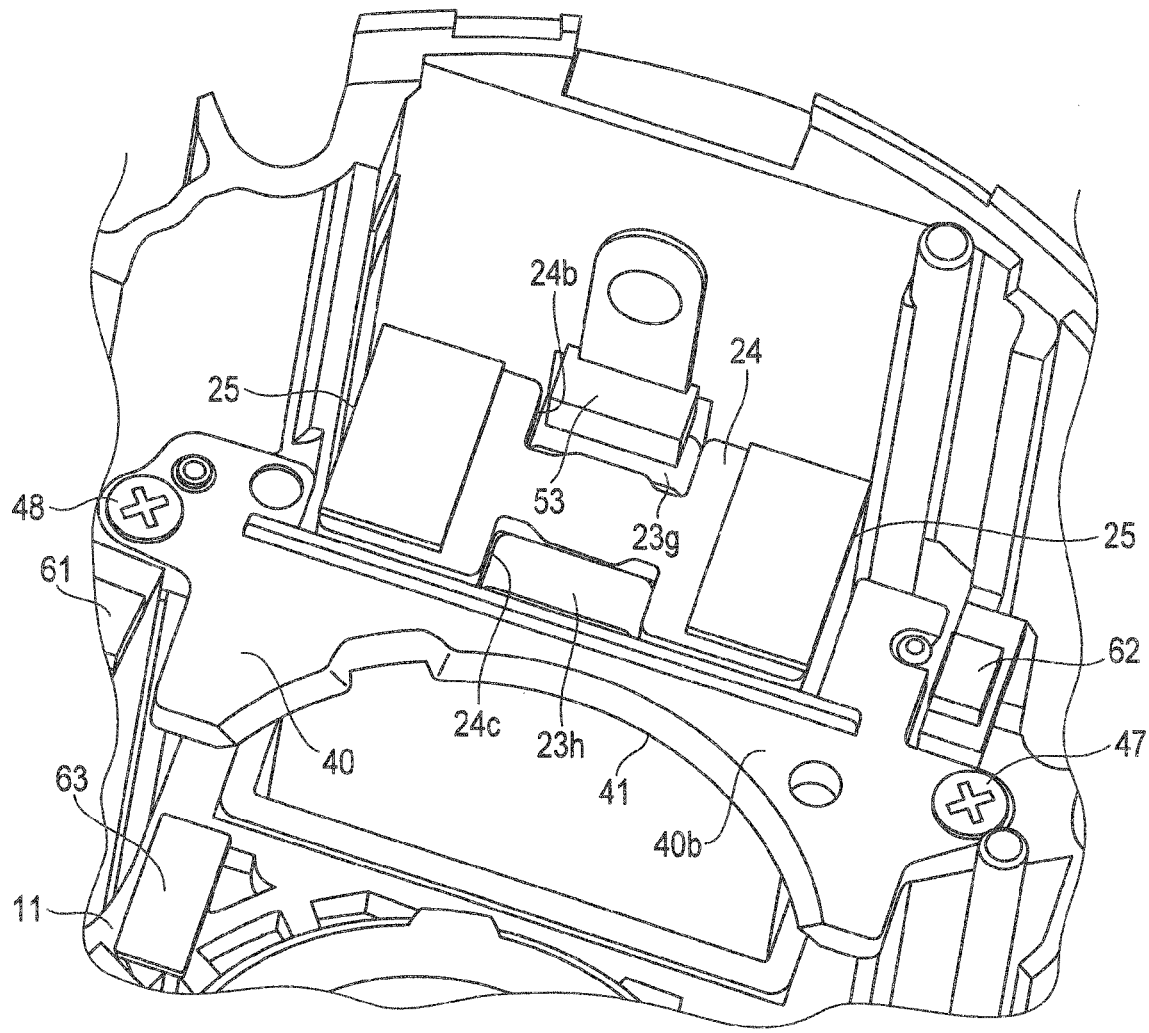
FIG. 13 is a perspective view illustrating a state in which the intermediate member is attached.

Next, the intermediate member 40 is attached, as shown in FIG. 13. The intermediate member 40 is inserted into the fixing frame 60 from the rear end thereof, with the surface 40a having the shock absorbing members 45 and 46 thereon facing the lens frame 11. Then, two screws 47 and 48 are inserted in the screw holes 42 and 43 of the intermediate member 40 and threadably engaged with the fixing frame 60. As a result, the intermediate member 40 is fastened and secured to the fixing frame 60. The intermediate member 40 is arranged between the range in which lens frame 11 is movable along the optical axis O and the range in which lens frame 12 is movable along the optical axis O. The intermediate member 40 is attached in such a manner that it does not contact the surrounding members with the exception of the fixing frame 60.

The shock absorbing members 45 and 46 (not shown in FIG. 13) pasted on the front surface 40a of the intermediate member 40 come into contact with part of the lens frame 11 when the front lens frame 11 is moved to the rear end position of the movable range. Shock absorbing members are required for absorbing a shock applied by the rear lens frame 12 when the rear lens frame 12 is moved to the forward end position of the movable range. In the present embodiment, shock absorbing members 61 and 62 (second shock absorbing members) are pasted on the fixing frame 60 in order to absorb the shock which the lens frame 12 may apply. The layout in which the shock absorbing members 61-66 are provided on the fixing frame 60 will be described later.

In the present embodiment, the shock absorbing members 45 and 46 for the front lens frame 11 are provided on one surface 40a of the intermediate member 40, and no shock absorbing member is provided on the other surface of the intermediate member 40. The shock absorbing members 61 and 62 for the rear lens frame 12 are provided on the fixing frame 60, not on the intermediate member 40. With this structure, when the two lens frames 11 and 12 are moved to the opposite ends of the respective movable ranges, a shock caused by one lens frame 11 (12) is prevented from being transmitted to the other lens frame 12 (11).

Figure 14:
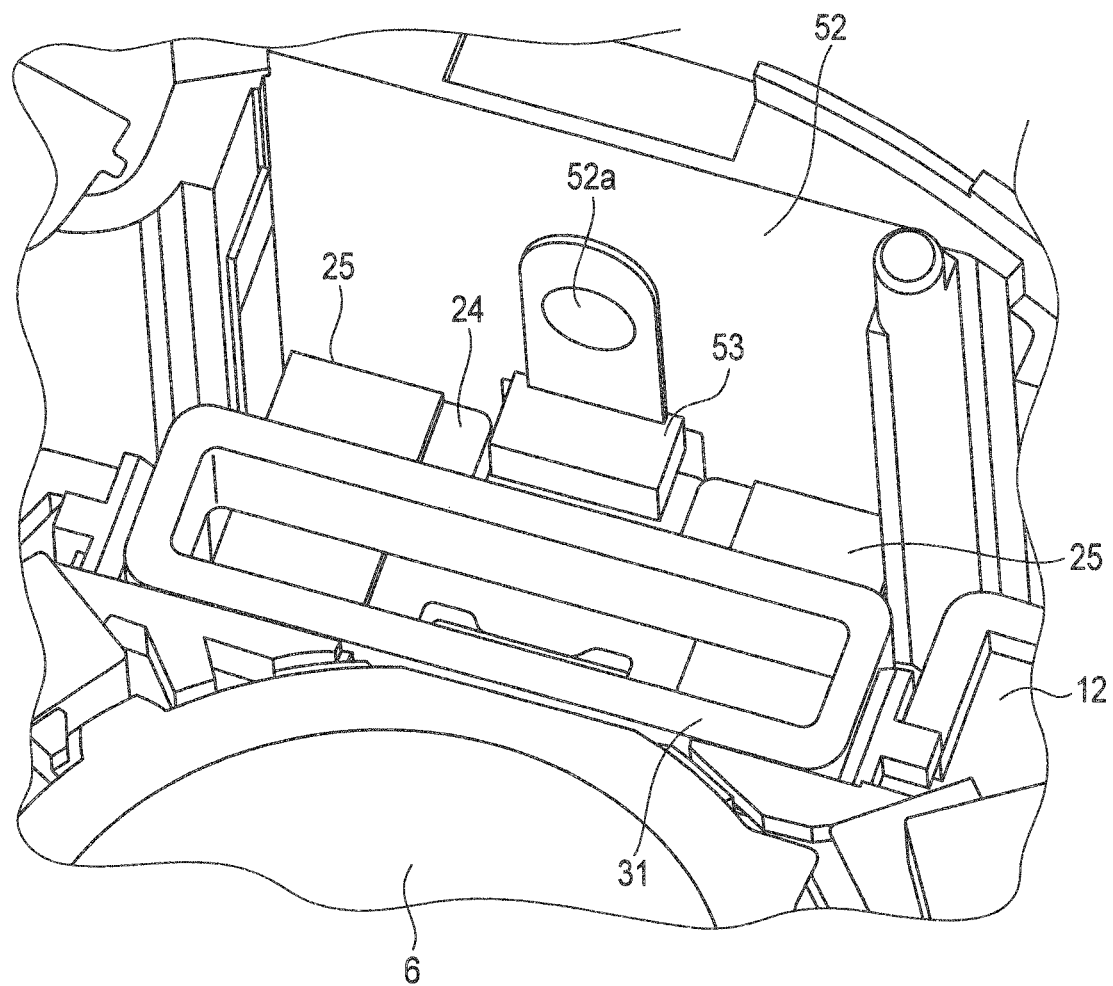
FIG. 14 is a perspective view illustrating a state in which a rear lens frame is assembled.

After the intermediate member 40 is attached, the lens frame 12 holding the rear movable lens group 6 is attached, as shown in FIG. 14. At the time, guide shaft 13 is fitted in the fitting groove 12a of the lens frame 12, and guide shaft 15 is inserted in the through hole 12b of the lens frame 12. As a result, the two guide shafts 13 and 15 prevent the lens frame 12 from moving in a direction perpendicular to the optical axis O, and the lens frame 12 is positioned.

Next, the second yoke 33 is attached to the second fixing portion 52 of the fixing frame 60. As shown in FIG. 15, the second yoke 33 has a second magnet 32 on the inner wall of the first portion 33a. The second magnet 32 is adhered to the first portion 33a. The first portion 33a has two through holes 33d for introducing an adhesive.

As shown in FIG. 16, the second yoke 33 provided with the second magnet 32 is inserted into the fixing frame 60, with the front end away from the connecting portion 33c (i.e., the opening 330) leading forward, and in such a direction that the first portion 33a faces the second fixing portion 52 of the fixing frame 60. In this state, the opening 230 of the first yoke 23 and the opening of the second yoke 33 are opposed to each other.

At the time, the second portion 33b of the second yoke 33 is inserted in the second coil 31 fixed to the lens frame 12. The projection 60 of the fixing frame 60 is fitted in the cutaway section 33e formed in the end portion of the first portion 33a which is away from the connecting portion 33c, and the second yoke 33 is positioned with reference to the fixing frame 60. Since part of the second yoke 33 strikes the projection 53, the second yoke 33 is prevented from coming into contact with the first yoke 23.

Then, as shown in FIG. 17, a screw 55 is inserted in a screw insertion hole 52a from the outside of the fixing frame 60 and is threadably engaged with a screw hole 33f formed in the outer wall of the first portion 33a of the second yoke 33. As a result, the second yoke 33 provided with the second magnet 32 is fixed to the second fixing portion 52 of the fixing frame 60. In the above steps, the components 10, 20, 30 and 40 of the assembly 50 are fabricated into the fixing frame 60.

Figure 18:
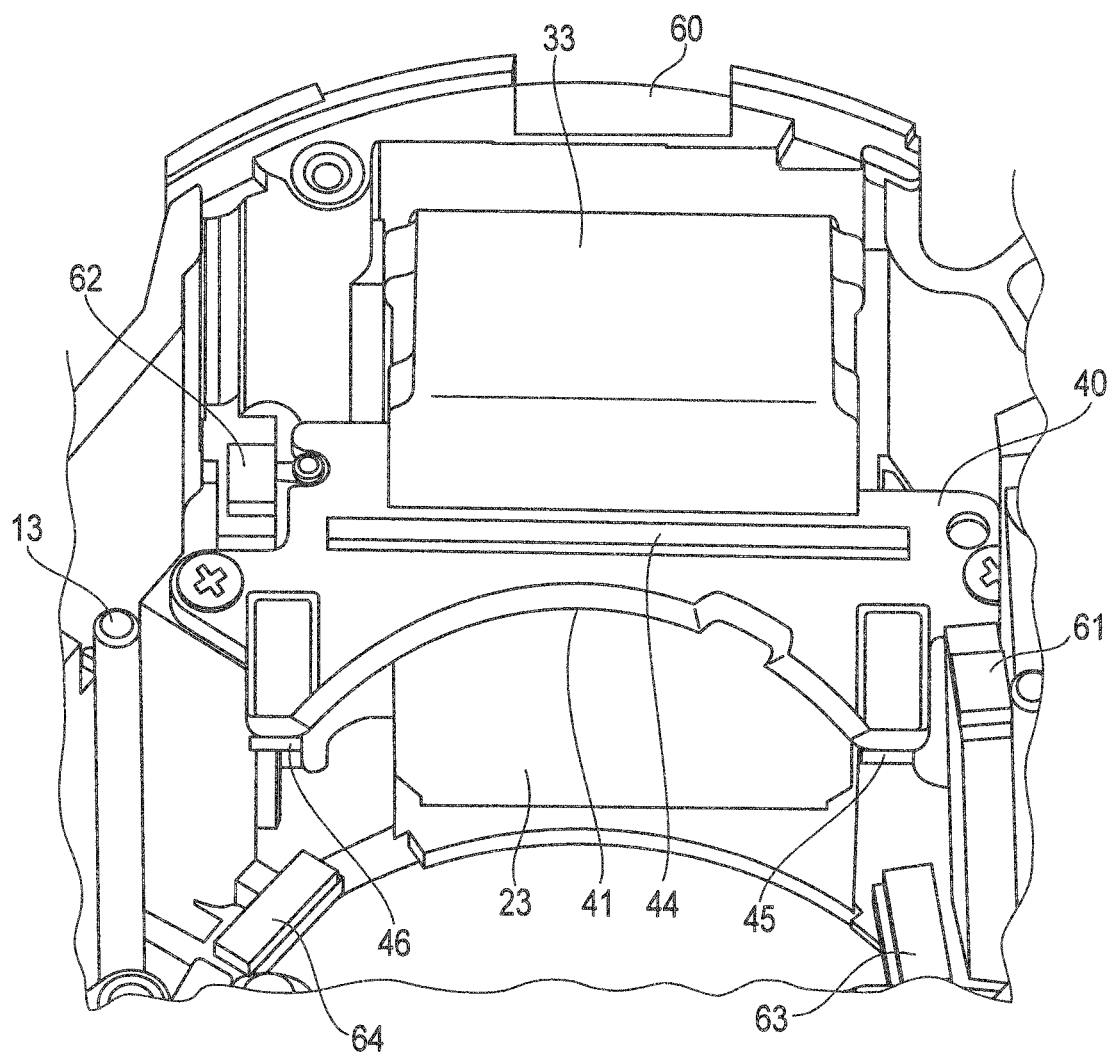
FIG. 18 is a perspective view illustrating the layout of shock absorbing members.
Figure 19:
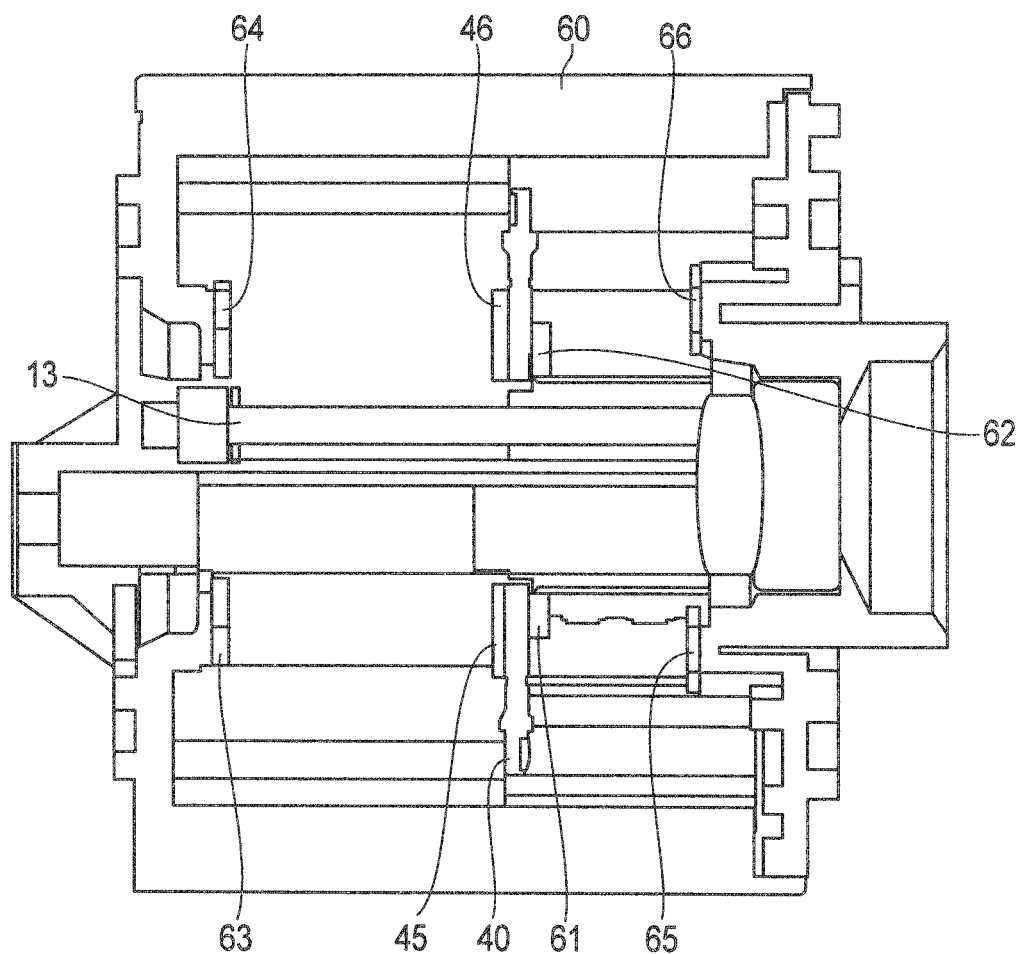
FIG. 19 is a sectional view illustrating the layout of the shock absorbing members.

A description will now be given with reference to FIGS. 18 and 19 of the layout of the shock absorbing members 45, 46 and 61-66. FIG. 18 is a perspective view illustrating the layout of the shock absorbing members 45 and 46 pasted on the intermediate member 40 and the shock absorbing members 61-64 pasted on the fixing frame 60. FIG. 19 is a sectional view illustrating the layout of the shock absorbing members 45, 46 and 61-66. In FIG. 18, illustration of the lens frames 11 and 12 is omitted for easy understanding of the positions of the shock absorbing members 45, 46 and 61-66. In FIG. 19, illustration of the actuators 20 and 30 is also omitted.

As described above, the shock absorbing members 45 and 46 are pasted on the front surface 40a of the intermediate member 40. These two shock absorbing members are provided at positions where they can absorb a shock which may be applied by the front lens frame 11 when the front lens frame 11 is moved to the rear end position of the movable range. On the other hand, two shock absorbing members 61 and 62 are pasted at positions where they can absorb a shock which may be applied by the rear lens frame 12 when the rear lens frame 12 is moved to the front end position of the movable range.

Shock absorbing members 63 and 64 are provided at positions where they can absorb a shock which may be applied by the front lens frame 11 when the front lens frame 11 is moved to the front end position of the movable range. Furthermore, shock absorbing members 65 and 66 are provided at positions where they can absorb a shock which may be applied by the rear lens frame 12 when the rear lens frame 12 is moved to the rear end position of the movable range.

By laying out the shock absorbing members 45, 46 and 61-66 as above, the shock applied by the front lens frame 11 is absorbed by the shock absorbing members 45 and 46, the shock applied by the rear lens frame 12 is absorbed by the shock absorbing members 61 and 62. Since the shocks are reliably absorbed and are not transmitted, the noise which the actuators 20 and 30 make when they operate can be reduced.

The present embodiment was described, referring to the case where shock absorbing members 45 and 46 (first shock absorbing members) are provided on the front surface of the intermediate member 40 and the rear end of the front lens frame 11 is brought into contact with them, and where shock absorbing members 61 and 62 (second shock absorbing members) are provided on the fixing frame 60 and the front end of the rear lens frame 12 is brought into contact with them. However, the present embodiment is not limited to this. For example, shock absorbing members 45 and 46 (first shock absorbing members) may be provided on the rear surface of the intermediate member 40, and the front end of the front lens frame 12 may be brought into contact with them. Likewise, shock absorbing members 61 and 62 (second shock absorbing members) may be provided on the fixing frame 60, and the rear end of the front lens frame 11 may be brought into contact with them. In either case, shock absorbing members need not be provided on both surfaces of the intermediate member 40; they are provided on only one surface of the intermediate member 40.

Next, the diaphragm function of the intermediate member 40 will be described with reference to FIGS. 20-24. The intermediate member 40 has not only the function of providing a partition between the movable range of the front lens frame 11 and the movable range of the rear lens frame 12, as mentioned above, but also the function of blocking the undesired light components, which are part of the light coming from an object to be photographed (not shown) and incident on the fixing frame 60 and which should not travel from the first movable range to the second movable range.

Figure 20:
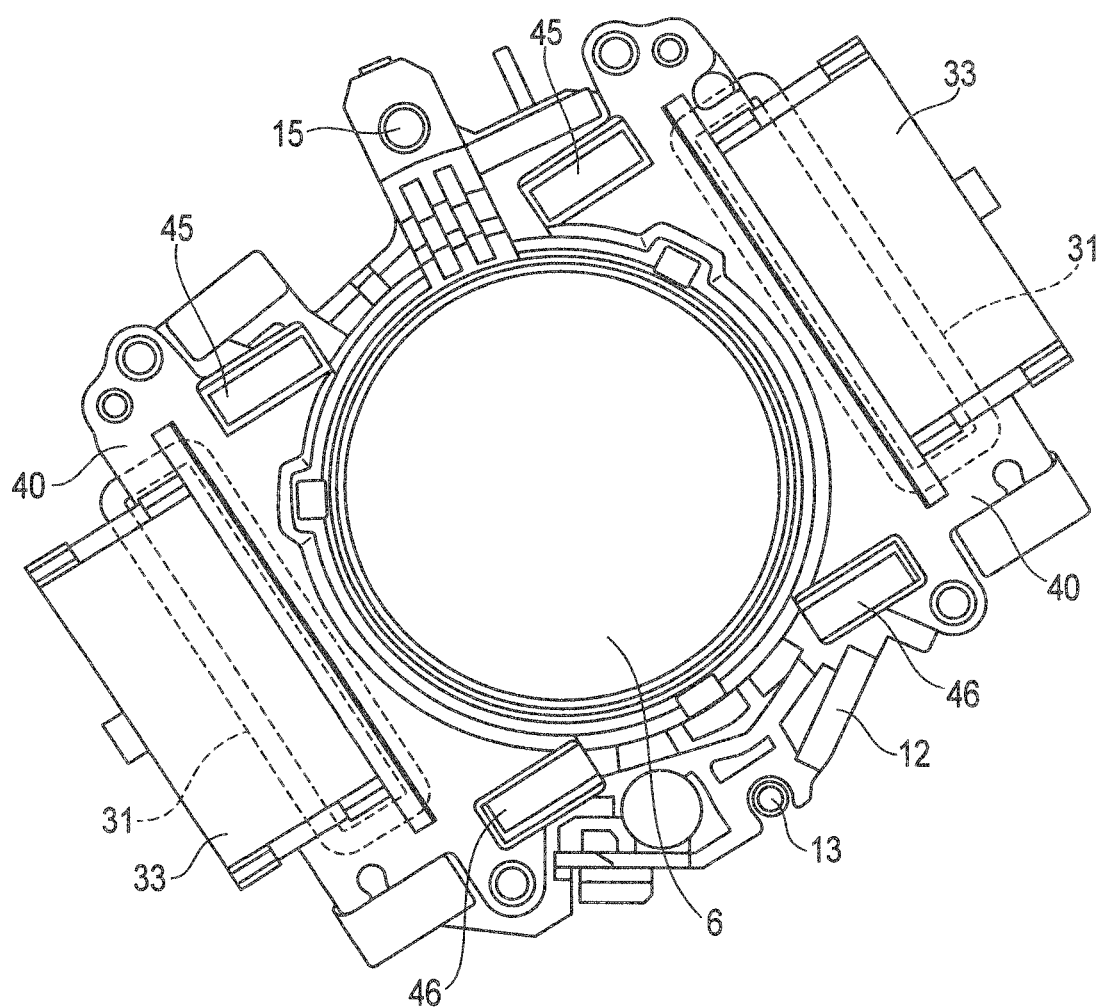
FIG. 20 is a schematic diagram illustrating how the front portion of the assembly looks like in the state in which the front lens frame is removed.
Figure 22:
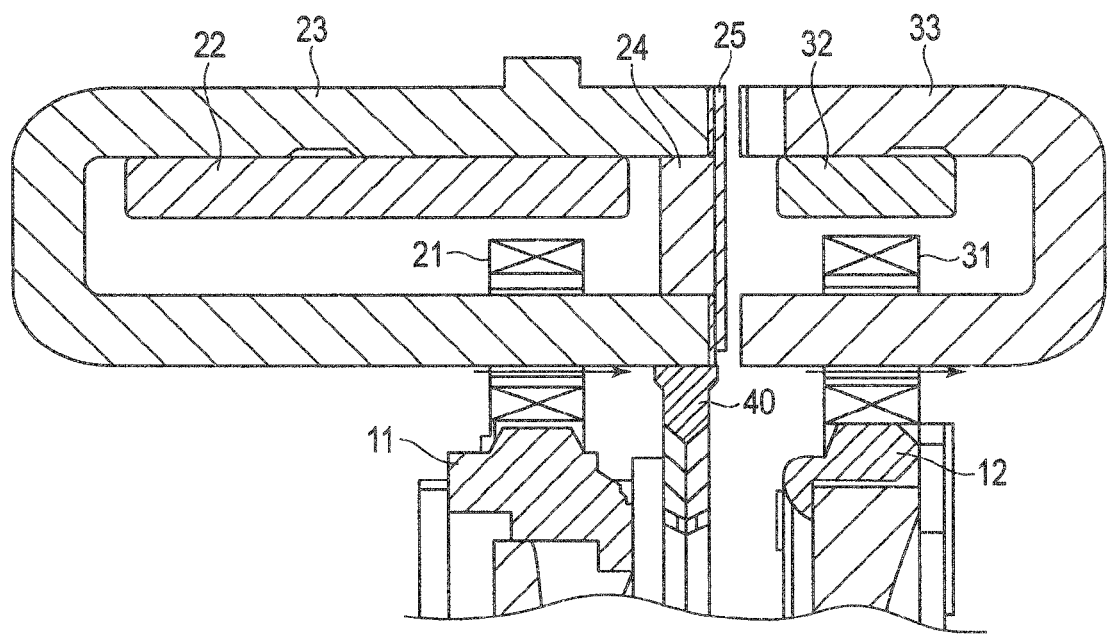
FIG. 22 is a sectional view illustrating a structure for blocking the light traveling through the region between the yoke and the coil.
Figure 23:
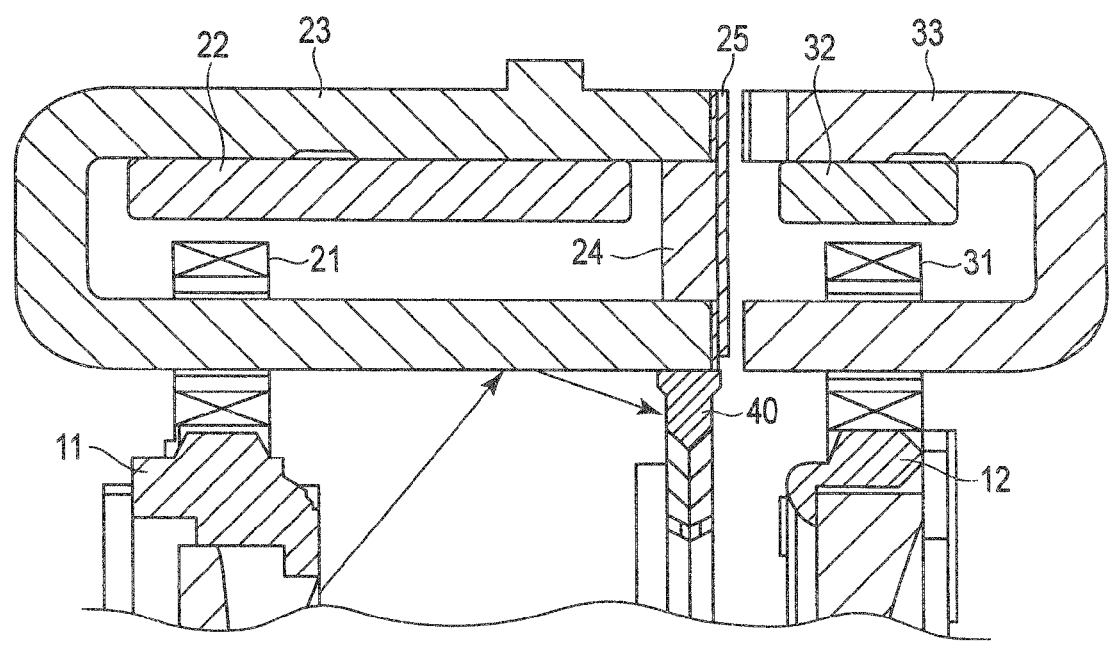
FIG. 23 is a sectional view illustrating a structure for blocking the light reflected by the yoke.

FIG. 20 is a schematic diagram illustrating how the front portion of the assembly looks like in the state in which the front lens frame 11 is removed. FIG. 21 is a schematic diagram illustrating how the rear portion of the assembly looks like in the state in which the rear lens frame 12 is removed. FIGS. 22 and 23 are partially-enlarged sectional views showing the main portion of the assembly 50 in an enlarged scale. As shown in FIGS. 20-23, the intermediate member 40 is in contact with the inner surface of the second portion 23b of the first yoke 23, and there is no gap between the intermediate member 40 and the second portion 23b.

With this structure, the light traveling from the first movable range and passing through the region between the second portion 23b of the first yoke 23 and the first coil 21 is blocked by the intermediate member 40 and is therefore prevented from entering the second movable range, as shown in FIG. 22. In addition, the light reflected by the inner surface of the second portion 23b of the first yoke 23 is blocked by the intermediate member 40 and is therefore prevented from entering the second movable range, as shown in FIG. 23. The light passing through a gap of the coil and the light reflected by the yoke may have an adverse effect on an image photographed by a camera (not shown). Therefore, the interchangeable lens 100 provides reliable optical characteristics by blocking such light components.

Figure 24:
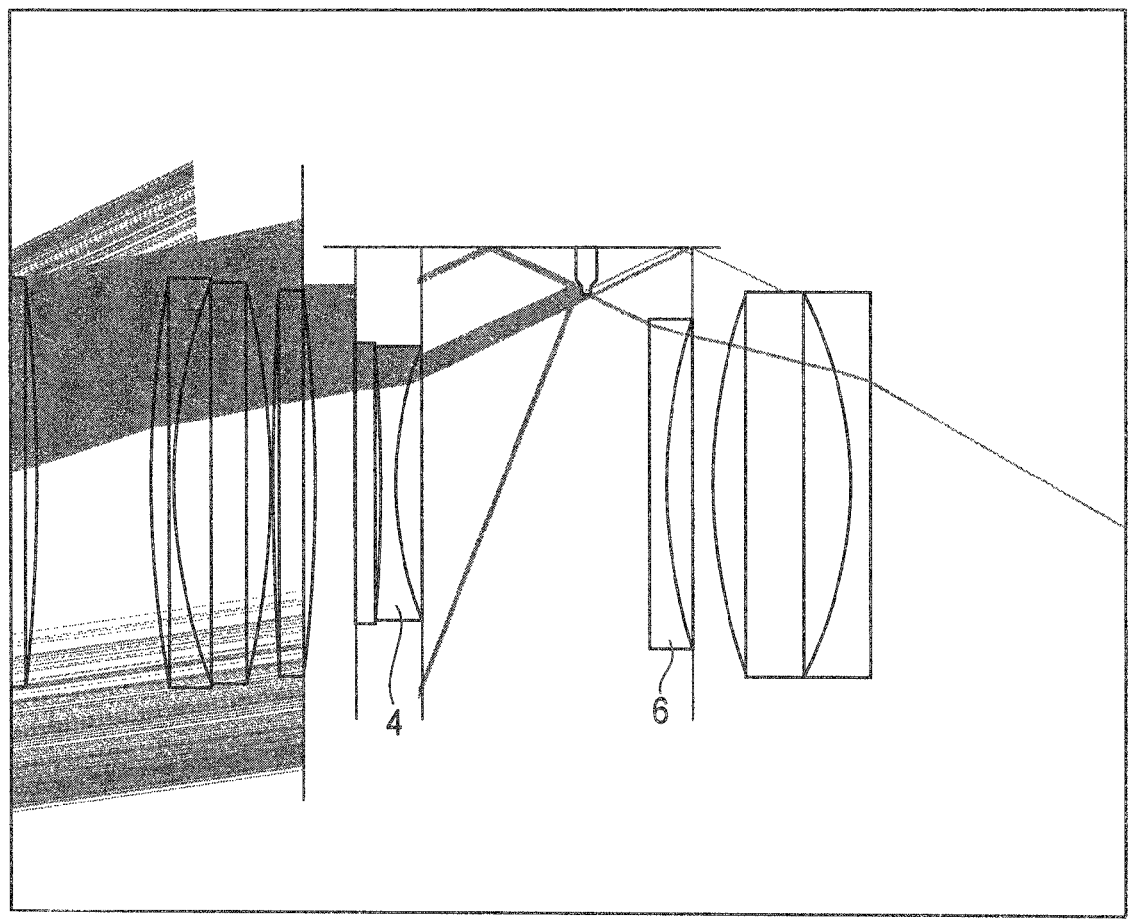
FIG. 24 illustrates how light incident on the fixing frame travels.

FIG. 24 illustrates how light incident on the fixing frame 60 travels. As should be clear from FIG. 24, the diaphragm function of the intermediate member 40 enables the blocking of many of the undesired light components of the light passing through the front movable lens group, such as a light component which travels through a gap of the coil without passing through the movable lens group 6 and a light component reflected by the yoke.

The length of the movable range of the front lens frame 11, as measured in the direction of the optical axis O, is determined by the length of the second portion 23b of the first yoke 23 of the actuator 20, as measured in the direction of the optical axis O. The length of the movable range of the rear lens frame 12, as measured in the direction of the optical axis O, is determined by the length of the second portion 33b of the second yoke 33 of the actuator 30, as measured in the direction of the optical axis O. In other words, the position of the intermediate member 40 serving as a partition between the two movable ranges is determined by the lengths of the first and second yokes 23 and 33, as measured in the direction of the optical axis O. Looked at from another angle, the intermediate member 40 can be arranged at the position where it achieves the most reliable diaphragm function, and the lengths of the first and second yokes 23 and 33 can be determined in accordance with the position of the intermediate member 40.

As described above, the interchangeable lens 100 of the embodiment is featured in that the intermediate member 40 having both a partitioning function (i.e., a shock absorbing function) and a diaphragm function is arranged between the movable range of the front lens frame 11 and the movable range of the rear lens frame 12. This feature enables reduction of the structural components required and easy assembly, and ensures improved optical characteristics.

According to the present embodiment, the first yoke 23 (and the third yoke) of the actuator 20 and the second yoke 33 of the actuator 30 are located away from each other in the direction of the optical axis O. With this structure, when one actuator 20 (30) operates, the other actuator 30 (20) is not affected by a magnetic force due to mutual induction, which may result in a noise component. Therefore, the two movable lens groups 4 and 6 can be accurately driven and controlled. The non-magnetic members 25 arranged between the first yoke 23 and the second yoke 33 are effective in reducing the adverse effects which may be caused by the magnetic force due to the mutual induction.

According to the present embodiment, the first yoke 23 and the second yoke 33 have a U-shaped structure. Accordingly, the yokes 23 and 33 can be assembled with ease, with no need to form an opening in the side portion of the outer frame 1. Accordingly, the assembling operation can be performed with high efficiency. In addition, since the outer frame 1 does not have an undesired opening, it has sufficient rigidity, and the mechanical strength of the interchangeable lens 100 can be enhanced.

According to the present embodiment, the third yoke 24 is not adhered to the first yoke 23. Accordingly, the assembling steps can be reduced, and the time to wait for an adhesive to harden is not required. As a result, the interchangeable lens 100 can be manufactured at low cost.

The present invention is not limited to the embodiment described above and can be modified in various manners without departing from the spirit of the invention.

The invention claimed is:

1. A lens barrel in which a first movable member holding a first lens group and a second movable member holding a second lens group are arranged in a direction of an optical axis and made movable with respect to a fixing frame, said lens barrel comprising:
    a first actuator including a first coil, a first magnet opposed to the first coil, and a first yoke with a U-shaped cross section, wherein the first actuator is configured to move the first movable member in the direction of the optical axis by a first magnetic circuit formed by the first coil, the first magnet and the first yoke;
    a second actuator including a second coil, a second magnet opposed to the second coil, and a second yoke with a U-shaped cross section, wherein the second actuator is configured to move the second movable member in the direction of the optical axis by a second magnetic circuit that is formed by the second coil, the second magnet and the second yoke and that is magnetically independent of the first magnetic circuit; and
    an intermediate member located between the first movable member and the second movable member and including a diaphragm of an optical system, that includes the first lens group and the second lens group, and a collision preventing member that prevents the first movable member and the second movable member from colliding with each other,
    wherein an opening of the first yoke with the U-shaped cross section is opposed to an opening of the second yoke with the U-shaped cross section, the opening of the first yoke and the opening of the second yoke being provided away from each other by a predetermined distance and being opposed to each other along the direction of the optical axis.

2. The lens barrel according to claim 1, further comprising:
    a first shock absorbing member that is located on a side of the intermediate member which faces the first movable member and that is configured to absorb a shock applied by collision of the first movable member; and
    a second shock absorbing member that is provided on the fixing frame and that is located at an end of a movable range of the second movable member which is close to the intermediate member, the second shock absorbing member being configured to absorb a shock applied by collision of the second movable member.

3. The lens barrel according to claim 1, wherein the intermediate member has a black surface.

4. The lens barrel according to claim 1, wherein the diaphragm has an opening edge which defines an opening that has a predetermined diameter, and which blocks one of (i) an undesired light component traveling through a gap between the first coil and the first yoke or a gap between the second coil and the second yoke and (ii) an undesired light component reflected by the first yoke or the second yoke.

5. The lens barrel according to claim 1, further comprising a third yoke arranged inside the opening of the first yoke or the opening of the second yoke such that the third yoke closes the opening of the first yoke or the opening of the second yoke, wherein the intermediate member is arranged inside the third yoke.

6. The lens barrel according to claim 5, wherein the third yoke is provided with a nonmagnetic member having a uniform thickness.

7. The lens barrel according to claim 6, wherein the third yoke includes a narrow central portion and upper and lower wide areas, and the nonmagnetic member is a rectangular sheet-like member provided on the upper and lower wide areas.

8. The lens barrel according to claim 1, wherein the intermediate member includes a rib for providing the intermediate member with rigidity.

* * * * *